United States Patent [19]
Wilton

[11] 3,770,466
[45] Nov. 6, 1973

[54] HEAT-INSULATING SHAPED COMPOSITIONS
[75] Inventor: John Wilton, Calumet City, Ill.
[73] Assignee: Foseco International Limited, Nechells, England
[22] Filed: Jan. 24, 1972
[21] Appl. No.: 220,402

Related U.S. Application Data
[63] Continuation of Ser. No. 30,996, April 22, 1970, abandoned, which is a continuation-in-part of Ser. No. 656,920, July 28, 1967, abandoned.

[52] U.S. Cl. ............... 106/56, 106/65, 106/DIG. 1, 252/62
[51] Int. Cl. ............................................ C04b 35/52
[58] Field of Search ............ 106/56, 99, 65, DIG. 1; 252/62

[56] References Cited
UNITED STATES PATENTS
2,516,342  7/1950  Randall et al. ............... 106/DIG. 1

Primary Examiner—James E. Poer
Attorney—Wolfe, Hubbard, Leydig, Voit and Osann

[57] ABSTRACT

Heat insulating compositions useful as slabs, riser sleeves, and the like are disclosed which consist essentially of a refractory fibrous material such as synthetic mineral wool, a binder, and a crushed coke or fly ash filler. The compositions can be used in the casting of copper based alloys or iron where the fibers themselves are not suitable.

9 Claims, 1 Drawing Figure

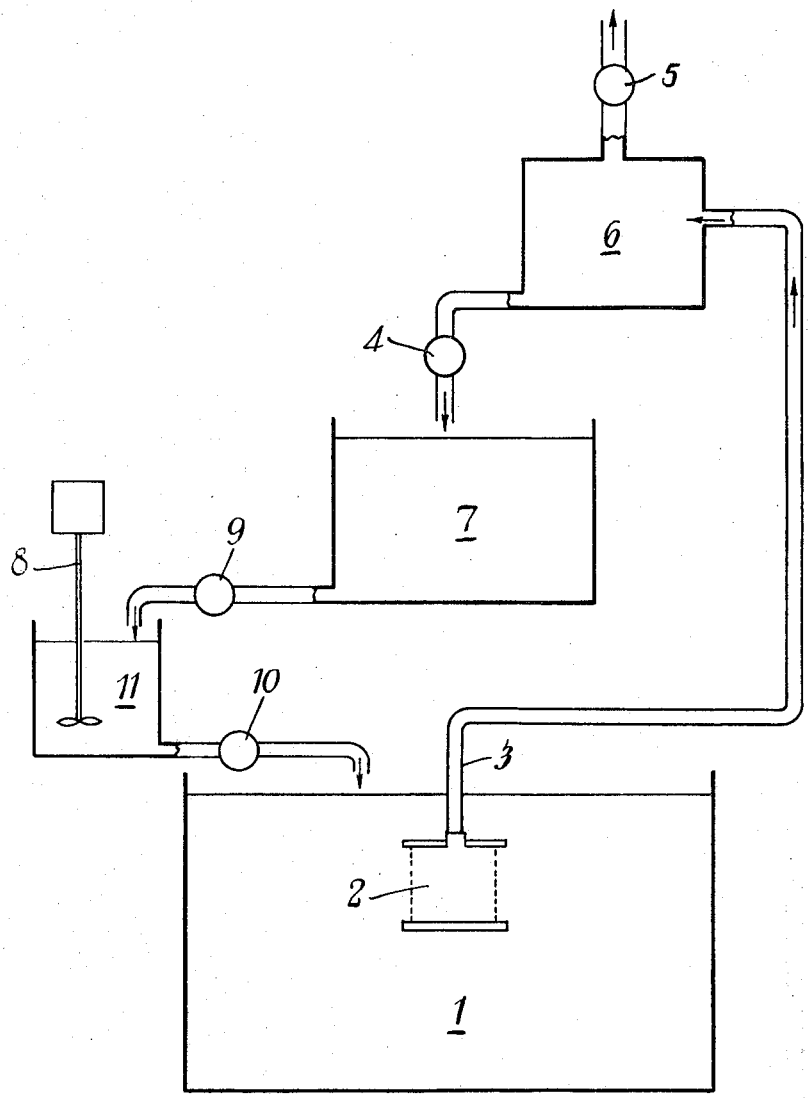

HEAT-INSULATING SHAPED COMPOSITIONS

DESCRIPTION OF THE INVENTION

This application is a Continuation of application Ser. No. 30,996, filed Apr. 22, 1970 which, in turn, is a continuation-in-part of Ser. No. 656,920, filed on July 28, 1967, entitled Heat-Insulating Shaped Compositions, both of which applications are now abandoned.

This invention relates to heat-insulating compositions, and especially to refractory fibrous compositions which contain particular high melting refractory fillers.

The desirability of using a fibrous refractory material in the preparation of heat insulating shaped compositions for use as slabs or sleeves for linining hot tops or the heads of ingot moulds in the foundry and related industries is well known. Compositions containing large quantities of such fibrous materials are highly porous, a factor which provides the compositions with good insulating characteristics and also makes them light in weight. Moreover, being fibrous with only a few small areas of inner fiber contact, there is little heat loss by way of conduction.

While the desirability of using fibrous refractory materials in the above noted applications is apparent, their use as such has been quite limited. The reason for this is that, except for the more expensive aluminosilicate refractory fibers, most refractory fibers simply do not possess the necessary refractoriness for many casting applications. Thus, slabs or sleeves prepared from customary refractory fibers such as rock wool or slag wool cannot be used when casting copper based alloys or iron since the associated casting temperatures of about 1,100° – 1,450°C. cause the fibers to shrink to an unacceptable extent. Such fiber shrinkage results in veins and cracks in the slabs or sleeves, and makes them unsuitable for their intended application. Moreover, heretofore, there has been no acceptable method for modifying the refractory fibers in order to make them suitable for the above-described uses.

Accordingly, it is a primary object of the present invention to provide a composition having the characteristics of a refractory fiber composition and which can be used as slabs or sleeves for the lining of hot tops or the heads of ingot moulds in the casting of metals at high temperatures.

An additional object is to provide a composition as above described wherein smaller than expected quantities of ingredients other than refractory fibers are needed.

Other objects and advantages of the invention will be apparent from the following detailed description taken in conjunction with the accompanying sole drawing which schematically illustrates an apparatus useful for preparing compositions according to the present invention.

While the invention is susceptible of various modifications and alternative constructions, there is shown in the drawings and will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

Briefly stated, the present invention is based on the discovery that, of the many refractory fillers available crushed coke and fly ash are unique in their ability to be combined with a fibrous refractory material and a binder therefore in sufficiently small quantities to yeild a composition which is highly refractory, and yet predominately exhibits the characteristics of the fibrous material in being highly porous and of good insulating quality. The compositions useful herein consist essentially of about 30–55% by weight of crushed coke or fly ash, about 40–60% by weight refractory fiber and about 4–8% of weight binder. The compositions, in a shaped form, can be effectively used in casting copper based alloys or iron without noticeable shrinking or other undesirable affects. In contrast, shaped compositions prepared with other refractory fillers shrink at comparable filler concentrations and have poor insulating characteristics when more filler is employed.

The synthetic fibrous refractory materials useful herein are preferably silicates. Particular application is found with respect to calcium silicate mineral wool fibers such as slag wool and rock wool since these fibers are not ordinarily useful by themselves in casting applications where temperatures in excess of about 800°C. are to be employed. However, in accordance with the present invention, by adding the above noted quantities of fly ash or crushed coke to such fibrous refractory materials, the useful operating temperature of shaped compositions prepared therefrom can be significatnly elevated. Thus, by adding the indicated ingredients to the types of mineral wool fibers discussed above, slabs or sleeves can be prepared for use in casting copper based alloys or iron wherein casting temperatures are as high as 1,450°C. Similarly, by adding the ingredients to aluminosilicate synthetic fibers the useful temperature limit of the fibers can be elevated. However, since in foundry applications aluminosilicate fibers can be used by themselves at temperatures up to about 1,400°C. the present invention is principally applicable to the slag or rock wool varieties of mineral fibers.

To an extent, the maximum operating temperature of the compositions described herein depends upon the purity of the fibers employed since the presence of alkali metal compounds tend to decrease the melting point of the fibers being employed. Also, it should be appreciated that the present compostions can be employed in applications where the above recited temperatures are momentarily exceeded so long as the continuous working level is below the indicated temperatures.

Typical examples of rock or slag wool and aluminosilicate fibers are as follows:

rock or slag wool analysis
  $CaO$ — 30–40%
  $SiO_2$ — 35–45%
  $Al_2O_3$ — 10–15%
  $MgO$ — 6–12%
  $MnO$ – about 1%
as well as traces of other oxides.

aluminosilicate analysis
  $Al_2O_3$ — 42–51%
  $SiO_2$ — 42–52%
  $TiO_2$ — 1–6%
as well as traces of other oxides.

Aside from the filler and the refractory fibers, the presently illustrated compositions also contain a binder in order to provide sufficient composition integrity to permit normal handling. The particular nature of the binder is not particularly important in achieving the advantages of the present invention. Accordingly, any of the known binders such as thermosetting resins, (e.g., phenol formaldehyde) and binders such as clay (bentonite and ball), starch, wheat flour, phosphate-modified starches, and colloidal silica can be used. Water soluble binders such as urea formaldehyde can also be used, either alone or in combination with the previously mentioned substantially insoluble binders, though the insoluble binders alone are generally not preferred when the compositions are prepared from an aqueous slurry.

While the filler, the refractory fiber, and the binder are essential ingredinets of the present composition, other ingredients which do not substantially detract from the desirable characteristics of the composition can also be present. Examples of other ingredients which can be included in minor amounts include oxides such as chromic oxide, milled or chopped spun organic fibers such as rayon, cotton, jute, polyacrylonitrite, etc., and zirconia flour.

Sleeves, slabs and the like prepared from the compositions described herein are preferably made by felting onto a mesh former from a slurry. By this means slabs and sleeves may be produced easily and quickly and of low density, for example of density 0.15–0.6 gm/cc., and particularly 0.35 gm/cc.

An embodiment of an apparatus useful for preparing the shaped compositions is illustrated in the accompanying drawing.

Referring to this drawing, the apparatus comprises a slurry tank 1, a perforated former 2 shown immersed in the tank, and conduit 3 leading from the former 2 via a reservoir and water trap 6 to a pump 5. A stop cock 4 is provided in the exit line from reservoir and water trap 6 to a further reservoir tank 7. The apparatus also includes a slurry formation tank 11 provided with a stirrer 8. A pump 9 is provided between tanks 7 and 11 and a further pump 10 betweentank 11 and tank 1, and the various elements of the apparatus are interconnected with piping as shown in the drawing. If desired a single pump may be provided with appropriate valves and cocks to perform the functions of the several pumps shown in the drawing.

In use, a slurry, generally having a solids content of about 0.2%–7%, is charged into the tank 1 and the former 2 is immersed in it. The pump 5 is brought into operation causing liquid to be sucked from the slurry tank 1 via the former 2, through the conduit 3 so that the solids of the slurry are deposited on the former. The reservoir 6 may discharge the withdrawn liquid into tank 7 by opening stop cock 4, whence it is discharged as required into tank 11. Further solid ingredients for the slurry are introduced into tank 11 and slurried in the liquid so introduced. The resultant slurry is used as a feed to the slurry tank 1. Thus the liquid is recycled and the solid constituents added to tank 11 are such as to constitute that which is deposited on the former 2.

When the desired thickness of solids is deposited on the former by the action of the apparatus as just described the former is raised clear of the slurry in the slurry tank. Continuing operation of the pump 5 causes withdrawal of liquid from the deposit carried by the former. This is important since without the continuation of vacuum as thus described the deposit on the former may tend to disintegrate as soon as it is stripped from the former as a shaped product.

The shaped deposit may be stripped from the former by any convenient method, e.g., it may be subjected to slight pressure to deform and loosen it from the former, it may be shaken free by vibration or it may be ejected by reversing the air flow of pump 5. The formed shapes are of course still wet and should be dried, e.g., by placing them in an oven.

By suitable choice of materials and other variable conditions of the previously described process, it is possible to operate at relatively low vacuum, e.g., 10 inches Hg. By reason of the fact that the slurry solids deposite to form a highly permeable slab, large quantities of liquid may be sucked very rapidly through the mesh. Thus, for example it has been found possible to produce sleeves of ½ inch thickness from a 2% by weight aqueous slurry in 5–10 seconds, using only 3 inches Hg. vacuum. Using this slurry technique, the refractory filler material preferably is predominately of particle size in the range - 100 + 300 mesh BSS sieve. If there is too great a proportion of very fine particles these tend to be lost by passing through the perforated former with the effluent. Furthermore, if the particle size distribution is very wide, a higher packing density will result, producing products of higher specific gravity and requiring longer times and greater suction pressures to effect dewatering. A suitable sieve grading for the refractory filler miaterial is one with no more than about 25% minus 300 mesh, the reminder being in the above-quoted range of −100 + 300 mesh.

The slabs, sleeves and the like made by the illustrated process can be stoved to increase their mechanical strength if desired. The products obtained can have a very low density, e.g., 0.2 gms. per cc or less, while the permeability can be as high as 300 AFS units, though normally no higher than 100 AFS.

The following Examples, in which all parts and percentages are by weight unless otherwise indicated, illustrate the invention.

EXAMPLE 1

The fibrous refractory material used in this example was a calcium silicate slag wool with a maximum use temperature of about 815°C. and analysing approximately thus: CaO, 38%; $Al_2O_3$; 14%; $SiO_2$ 36%; MgO, 8% with four percent miscellaneous impurities ($TiO_2$, MnO, $Fe_2O_3$ and the like).

A slurry of 3% by weight solids content was made, the solid material dispersed in the slurry having the following composition by weight:

35% crushed coke
57% fibrous refractory (as above)
8% resin binder (1:2 mixture of urea-formaldehyde and
phenol formaldehyde resins)

A former consisting of a cylindrical chamber having mesh walls on its curved surface was connected by a hose to a vacuum pump, the apparatus being as illustrated in the accompanying drawing.

The former was immersed in the slurry and a vacuum pressure of 3 inches Hg. applied via the pump. This was continued for about 15 seconds, water being sucked away at the rate of 12–15 gallons per minute. There was thus formed on the former a sleeve of height 6 inches, outside diameter 5 inches and inside diameter 4 inches.

The sleeves thus made were stripped from the former by reversing the air flow and then dried at about 175°C., a drying time of only 1½ – 2 hours being found to be sufficient. The product has a density of 0.3–0.35 gm/cc. and a permeability of above 57 AFS units.

A sleeve prepared as just described was used to line the feeder head in casting cast iron, which was poured at 1,350°C., and the cooling curve of the casting was determined. It was found that the sleeve gave a 20 minutes delay between the pouring of the metal and its solidification, this being more than double that which was found when using a conventional sleeve of bonded sand.

EXAMPLE 2

Various sleeves were made up by the process described in Example 1 having compositions in the ranges of:

| | |
|---|---|
| coke dust (−100 mesh BSS) or fly ash | 30—55% |
| calcium silicate fiber | 40—60% |
| urea-formaldehyde/phenol-formaldehyde resin mixture (1:2) | 4—8% |

These sleeves were found to be of particular value in casting iron and copper base alloys.

EXAMPLE 3

Sleeves having the following compositions, produced by the method described in Example 1, performed well as riser sleeves for cast iron castings.

| | |
|---|---|
| Calcium silicate fiber | 37% |
| Coke dust (−100 mesh BSS) | 55% |
| urea-formaldehyde/phenol-formaldehyde mixture (1:2) | 8% |

EXAMPLE 4

Slabs of the following compositions were found to be suitable for use in lining the feeder heads of both cooper base and cast iron castings.

| | |
|---|---|
| aluminosilicate fiber | 34% |
| coke dust (−100 BSS mesh) | 60% |
| urea-formaldehyde/phenol-formaldehyde resin mixture (1:2) | 6% |

These slabs were conveniently made by felting from a slurry as described earlier.

I claim as my invention:

1. A heat insulating shaped composition for use in the casting of molten metals at casting temperatures as high as 1,450°C., said composition consisting essentially of about 30–55% by weight of a refractory filler selected from the group consisting of crushed coke and fly ash, about 40–60% by weight of synthetic refractory fiber, and about 4–8% by weight binder.

2. The composition of claim 1 wherein the refractory filler is crushed coke.

3. The composition of claim 1 wherein the refractory fiber is slag or rock wool.

4. The composition of claim 3 wherein the refractory filler is crushed coke.

5. The composition of claim 1 wherein the refractory filler is fly ash.

6. The composition of claim 3 wherein the refractory filler is fly ash.

7. The composition of claim 1 wherein the binder is selected from phenol formaldehyde, clay, starch, wheat flour, phosphate modified starches, colloidal silica, and urea formaldehyde.

8. The composition of claim 4 wherein the binder is selected from phenol formaldehyde, clay, starch, wheat flour, phosphate modified starches, colloidal silica, and urea formaldehyde.

9. The composition of claim 6 wherein the binder is selected from phenol formaldehyde, clay, starch, wheat flour, phosphate modified starches, colloidal silica, and urea formaldehyde.

* * * * *